(12) United States Patent
Mohiuddin et al.

(10) Patent No.: US 11,403,610 B2
(45) Date of Patent: Aug. 2, 2022

(54) SYSTEMS AND METHODS FOR INVENTORY MONITORING

(71) Applicant: Sensormatic Electronics, LLC, Boca Raton, FL (US)

(72) Inventors: Mohammad Mohiuddin, Boynton Beach, FL (US); Melwyn F. Sequeira, Plantation, FL (US); Mark Antilla, Davie, FL (US); Hubert A. Patterson, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 183 days.

(21) Appl. No.: 15/849,179

(22) Filed: Dec. 20, 2017

(65) Prior Publication Data

US 2018/0204199 A1    Jul. 19, 2018

Related U.S. Application Data

(60) Provisional application No. 62/446,320, filed on Jan. 13, 2017.

(51) Int. Cl.
| | |
|---|---|
| *G06Q 20/20* | (2012.01) |
| *G01G 19/414* | (2006.01) |
| *G01G 3/13* | (2006.01) |
| *G06Q 10/08* | (2012.01) |
| *G01G 19/42* | (2006.01) |
| *G07F 9/02* | (2006.01) |

(52) U.S. Cl.
CPC ............ *G06Q 20/203* (2013.01); *G01G 3/13* (2013.01); *G01G 19/4144* (2013.01); *G01G 19/42* (2013.01); *G06Q 10/087* (2013.01); *G07F 9/026* (2013.01)

(58) Field of Classification Search
CPC .... G06Q 20/203; G06Q 10/087; G07F 9/026; G01G 19/42; G01G 19/4144; G01G 3/13
See application file for complete search history.

(56) References Cited

U.S. PATENT DOCUMENTS

| | | | |
|---|---|---|---|
| 7,529,597 B1 * | 5/2009 | Hertz ........................ | G07F 5/18 700/241 |
| 9,395,723 B2 * | 7/2016 | Pari .......................... | B25J 5/007 |
| 10,558,944 B1 * | 2/2020 | Elazary ................. | G06Q 10/087 |
| 2003/0057226 A1 * | 3/2003 | Long ....................... | G07F 11/04 221/92 |

(Continued)

*Primary Examiner* — Allen C Chein
(74) *Attorney, Agent, or Firm* — Arent Fox Schiff LLP

(57) ABSTRACT

Systems and methods for performing inventory management. The methods comprise: measuring, by an Out Of Stock ("OOS") sensor at a first time, a first collective weight of a plurality of items disposed thereon; measuring, by the OOS sensor at a second later time, a second collective weight of a plurality of items disposed thereon; using the first and second collective weights to determine if an item has been added to or removed from the OOS sensor; and wirelessly communicating, from the OOS sensor to a remote computing device, a notification that an item has been added to or removed from the OOS sensor such that stored inventory information is updated accordingly. The OOS sensor comprises a base layer having a planar cross-sectional profile and an array of weight measuring sensors (e.g., piezoresistive sensors).

20 Claims, 10 Drawing Sheets

(56) References Cited

U.S. PATENT DOCUMENTS

| | | | |
|---|---|---|---|
| 2008/0024311 A1* | 1/2008 | Mann | A61B 5/11 340/573.1 |
| 2010/0179844 A1* | 7/2010 | LaFergola | G07C 5/08 701/31.4 |
| 2011/0184751 A1* | 7/2011 | Holmes | G06F 19/3462 705/2 |
| 2012/0190386 A1* | 7/2012 | Anderson | G01S 19/14 455/456.3 |
| 2012/0241516 A1* | 9/2012 | Zuleeg | G06F 15/173 235/375 |
| 2014/0180785 A1* | 6/2014 | Argue | G06Q 30/0223 705/14.24 |
| 2014/0201042 A1* | 7/2014 | Meyer | G06Q 10/087 705/28 |
| 2015/0073925 A1* | 3/2015 | Renfroe | G06Q 30/0641 705/15 |
| 2015/0178671 A1* | 6/2015 | Jones | G06Q 10/087 705/28 |
| 2015/0278790 A1* | 10/2015 | Jain | G01G 19/40 705/22 |
| 2016/0048798 A1* | 2/2016 | Meyer | G01G 19/4144 705/28 |
| 2016/0110701 A1* | 4/2016 | Herring | G06K 9/00624 705/17 |
| 2016/0260161 A1* | 9/2016 | Atchley | G05D 1/0255 |
| 2016/0283899 A1* | 9/2016 | Ryan, III | G06Q 10/087 |
| 2016/0351787 A1* | 12/2016 | Lin | B06B 1/0688 |
| 2018/0005173 A1* | 1/2018 | Elazary | G06Q 30/0202 |

\* cited by examiner

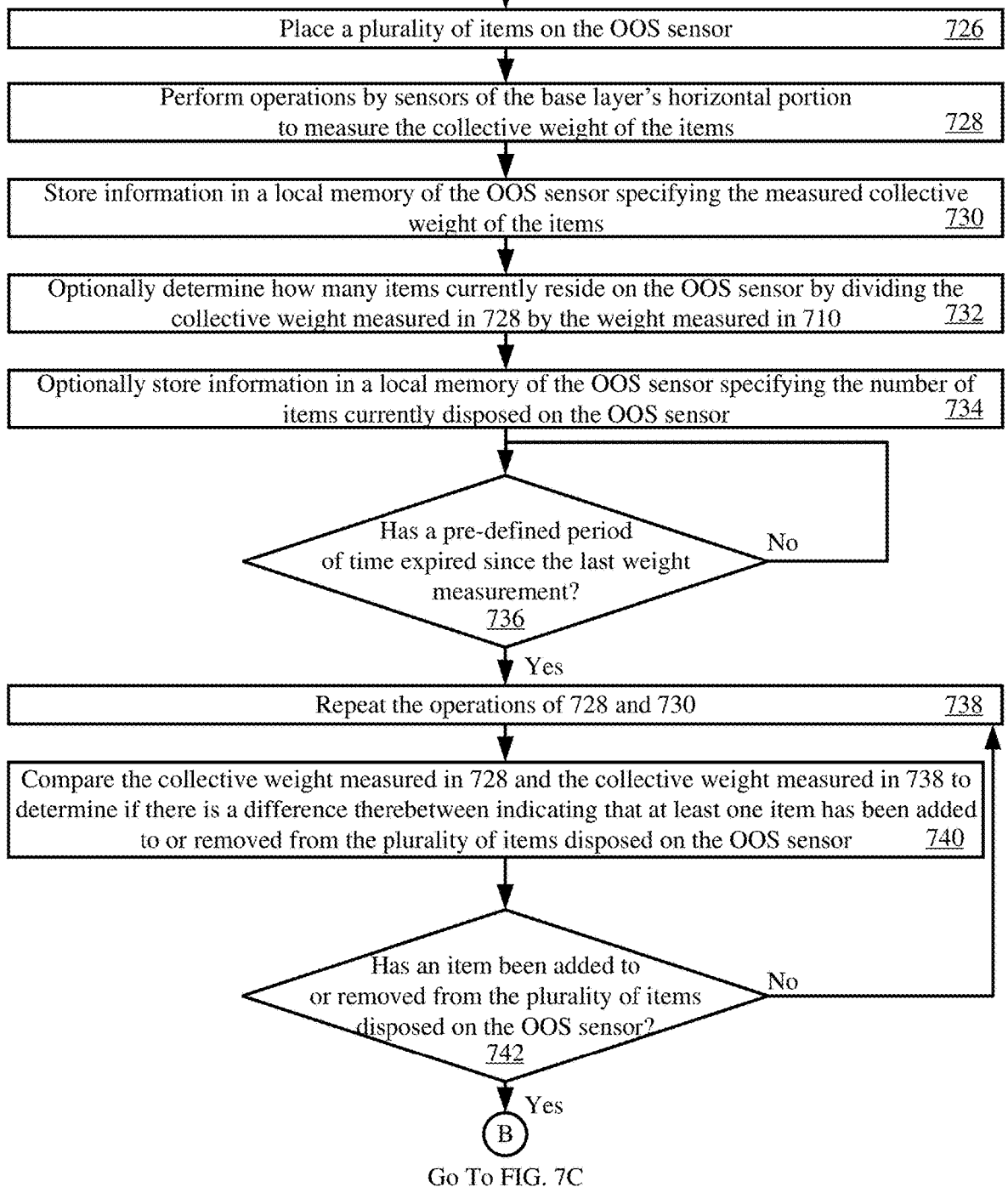

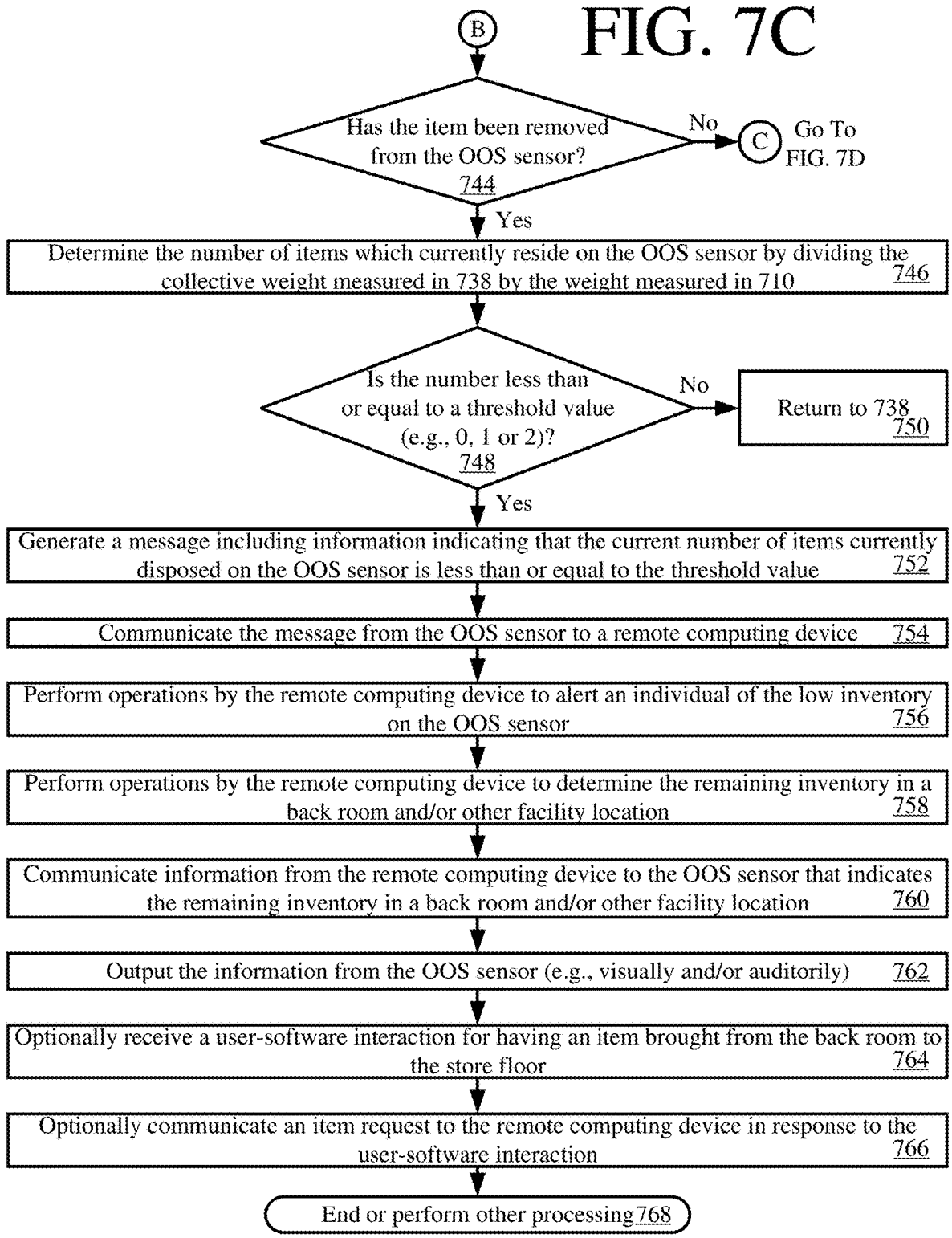

SYSTEMS AND METHODS FOR INVENTORY MONITORING

CROSS-REFERENCE TO RELATED APPLICATIONS

This application claims priority to U.S. Application No. 62/446,320 which was filed Jan. 13, 2017 and which is incorporated herein in its entirety.

FIELD

This document relates generally to inventory systems. More particularly, this document relates to systems and methods for inventory monitoring.

BACKGROUND

In a retail environment when inventory is depleted, employees restock the items on the display equipment accessible to customers (e.g., shelves and cabinets). But before the employees restock the items, they have to manually scan the display equipment to identify which items have a low inventory or no inventory on the store floor. Alternatively, customers query employees to check in the back room for the out of stock item(s). In some cases, an item is not actually out of stock but rather misplaced in on the store floor (e.g., when another customer takes on item for its assigned shelf and places it at another location in the store).

Retails stores have from hundreds to hundreds of thousands of items on their retail floors. Keeping the merchandise stocked up for the customers is a daunting task. The problem is even worse for the fast moving items. This problem is further exacerbated during peak sale season. Even with best efforts from the store employees and management, items are sold out or miss-located. This translates to lost sales.

SUMMARY

Systems and methods are described herein for performing inventory management. The methods comprise: measuring, by an Out Of Stock ("OOS") sensor at a first time, a first collective weight of a plurality of items disposed thereon; measuring, by the OOS sensor at a second later time, a second collective weight of a plurality of items disposed thereon; using the first and second collective weights to determine if an item has been added to or removed from the OOS sensor; and wirelessly communicating, from the OOS sensor to a remote computing device, a notification that an item has been added to or removed from the OOS sensor such that stored inventory information is updated accordingly.

The OOS sensor comprises a base layer having a planar cross-sectional profile and an array of weight measuring sensors (e.g., piezoresistive sensors). The OOS sensor is disposed on or integrated with a piece of display equipment (e.g., a shelf). A determination is made that the item has been added to the OOS sensor when the second collective weight is greater than the first collective weight. In contrast, a determination is made that the item has been removed from the OOS sensor when the first collective weight is greater than the second collective weight.

In some scenarios, the methods further comprise: determining a number of items currently residing on the OOS sensor by dividing the second collective weight by a reference weight previously measured for a single item; comparing the number of items to a threshold value; wirelessly communicating a low inventory notification from the OOS sensor to the remote computing device when the number of items is less than the threshold value; obtaining current inventory information indicating a remaining inventory for the item in a back room or other facility location; outputting the current inventory information from the OOS sensor; receiving, by the OOS sensor, a user-software interaction for having an item retrieved from the back room; and wirelessly communicating an item request from the OOS sensor to the remote computing device in response to the user-software interaction.

In those or other scenarios, the methods further comprises: performing operations by the OOS sensor to determine if the item added thereto is of the same type as an item assigned to the OOS sensor; wirelessly communicating, from the OOS sensor to the remote computing device, added item information indicating at least a measured weight of the item added thereto, when a determination is made that the item added thereto is not of the same type as the item assigned to the OOS sensor; using the measured weight contained in the added item information to identify at least one item in inventory which could potentially be the item added to the OOS sensor; and/or performing operations by the remote computing device to notify an individual of a misplaced item disposed on the OOS sensor.

DESCRIPTION OF THE DRAWINGS

The present solution will be described with reference to the following drawing figures, in which like numerals represent like items throughout the figure.

FIGS. 7A-7D (collectively referred to as "FIG. 7") provide a flow diagram of an illustrative method for managing inventory.

DETAILED DESCRIPTION

Figure 1:
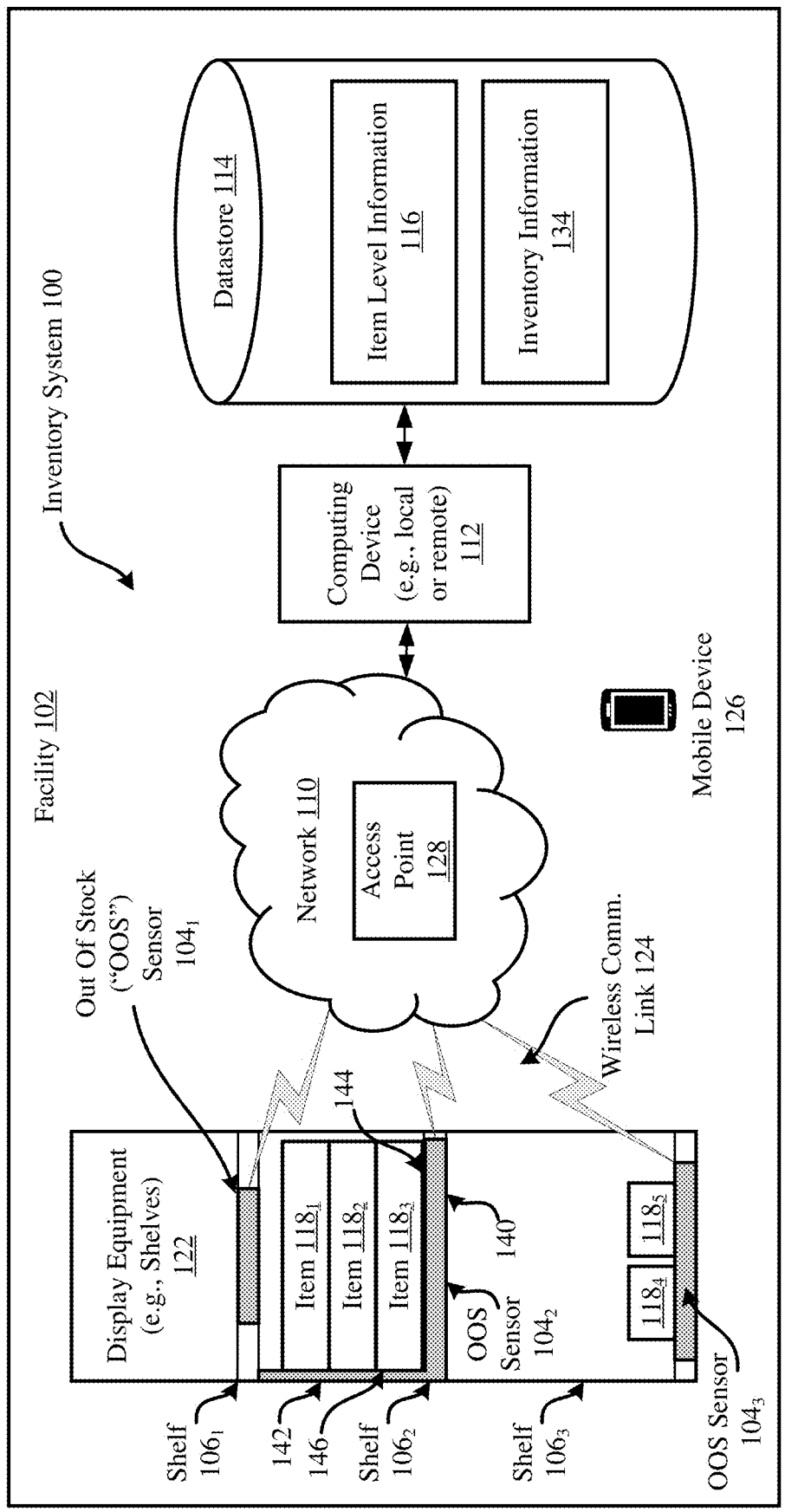
FIG. 1 is an illustration of an illustrative inventory system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution concerns an electronic Out Of Stock ("OOS") sensor. The OOS sensor overcomes the drawbacks of conventional inventory processes and systems, such as those described above in the Background section of this document. The OOS sensor comprises a mat with a plurality of sensors embedded therein. The OOS sensor measures the weight and the size of individual items placed thereon. Based on the weight and size measurements, the OOS sensor can determine (with a relatively high degree of confidence) how many items are placed thereon regardless of the items' orientations (e.g., rows or stacks). The OOS sensor also comprises a communication device (e.g., a Radio Frequency ("RF") transceiver) to facilitate real-time inventory reporting and alerting. An alert can be sent from the OOS sensor to a remote computing device (e.g., an enterprise server) in response to a detection that inventory is low or depleted to zero. Additionally, the OOS sensor can determine when an item is misplaced since the system knows the size and weight of each item on the retail store floor. An alert can be sent from the OOS sensor when a determination is made that an item is misplaced.

Referring now to FIG. 1, there is provided an illustration of an illustrative inventory system 100. Inventory system 100 is entirely or at least partially disposed within a facility 102. The facility 102 can include, but is not limited to, a manufacturer's facility, a distribution center facility, a retail store facility or other facility within a supply chain.

Figure 4:
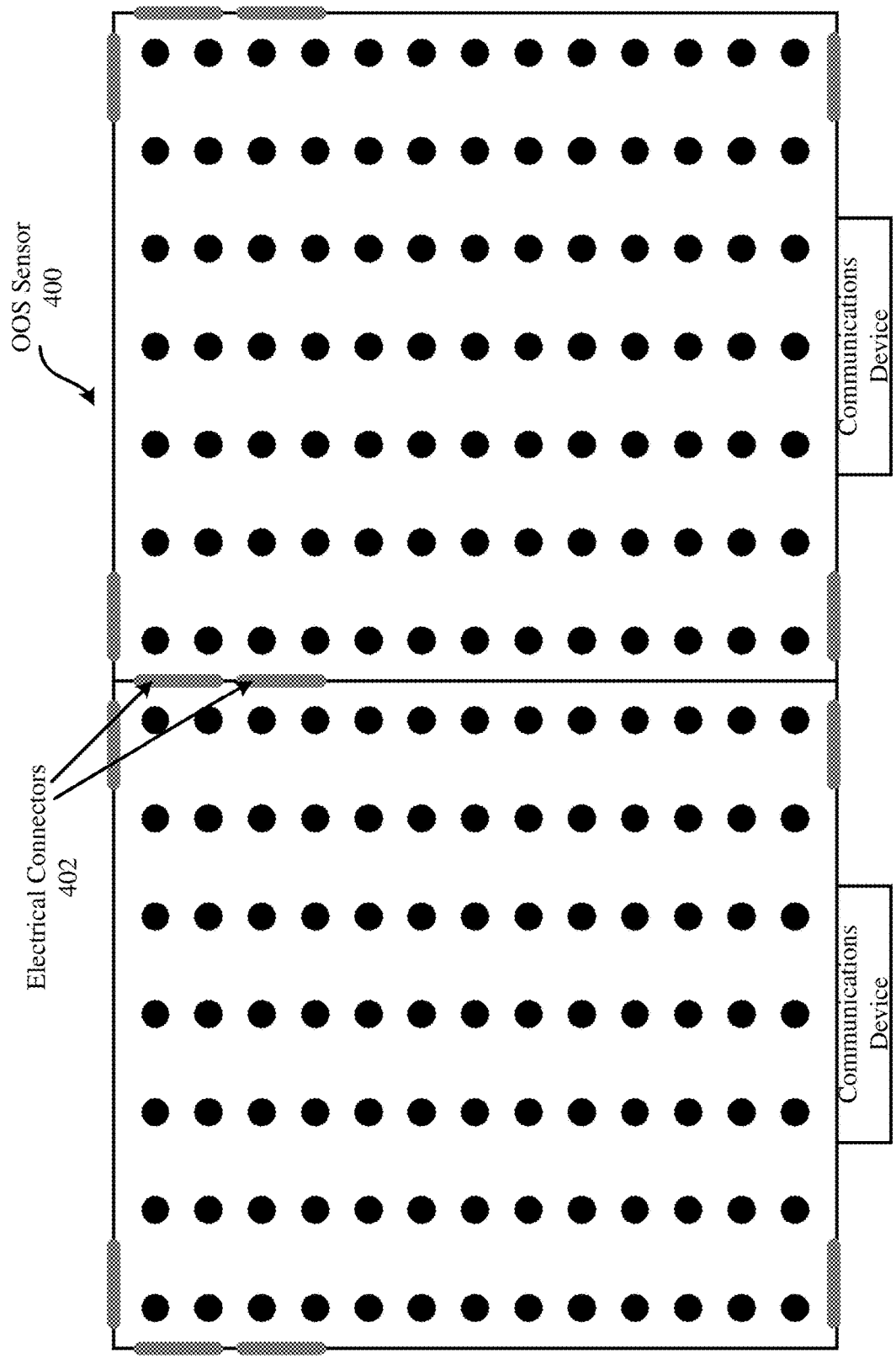
FIG. 4 is an illustration of two modular OOS sensors combined together to form a larger OOS sensor.

As shown in FIG. 1, a plurality of items $118_1, \ldots, 118_5$ reside within the facility 102. The items $118_1, \ldots, 118_5$ are disposed on display equipment 122. The display equipment includes, but is not limited to, shelves $106_1$-$106_3$, display cabinets, and/or exhibit cases. In the shelf scenario, each shelf $106_1$-$106_3$ may have at least one OOS sensor $104_1$-$104_3$ disposed thereon, coupled thereto, and/or integrated therewith. This coupling is achieved via frictional engagement between the OOS sensor and the shelf, a mechanical coupler (e.g., straps, bands, clamps, snaps, suction cups, etc.), an adhesive (e.g., glue), or other means. The OOS sensors $104_1$-$104_3$ are modular so that two or more can be combined to form a larger OOS sensor, as shown in FIG. 4.

The OOS sensors $104_1$-$104_3$ are configured to visually and/or auditorily output information relating to the respective items stored thereon. For example, each OOS sensor $104_1$-$104_3$ displays information indicating whether there are more items of a given type in a back room of the facility 200 or at a different store location.

Each OOS sensor $104_1$-$104_3$ is also configured to facilitate an individual's request that an item be brought from the back room when none exist on the shelf. The request can be made via an input means (e.g., a push button) of the OOS sensor $104_1$-$104_3$, and/or through the use of the individual's mobile device 126. In this regard, the OOS sensors $104_1$-$104_3$ are connected to a network 110 via a communications technology. The communications technology can include, but is not limited to, Radio Frequency ("RF") communication technology, Bluetooth technology, WiFi technology, beacon technology, and/or LiFi technology. Each of the listed types of communication technology are well known in the art, and therefore will not be described herein.

In some scenarios, the OOS sensors $104_1$-$104_3$ are also configured to provide a visual and/or auditory output of item level information. The item level information includes, but is not limited to, an item description, item nutritional information, a promotional message, an item regular price, an item sale price, a currency symbol, and/or a source of the item. The item level information can be output in a format selected from a plurality of formats based on a geographic location of the item, a date, and/or an item pricing status (e.g., whether the item is on sale). In a display context, the format is defined by a font parameter, a color parameter, a brightness parameter, and/or a display blinking parameter. In an auditory context, the format is defined by a volume parameter, a voice tone parameter, and/or a male/female voice selection parameter. This feature can be at least partially implemented by incorporating Electronic Smart Labels ("ESLs") with the OOS sensors or implementing features of the ESLs by the OOS sensors. ESLs are well known in the art, and therefore will not be described herein. Any known or to be known ESL and/or ESL features can be used and/or employed here.

During operation, each OOS sensor $104_1$-$104_3$ is calibrated at the time of being placed on a piece of display equipment 122. This calibration involves: placing a single item assigned to the display equipment on the OOS sensor; measuring the weight of the item; storing information specifying the measured weight in a local memory of the OOS sensor; identifying which sensors of a plurality of sensors are disposed under the item's bottom wall and/or reside adjacent to the item's sidewall; determining the item's geometrical dimensions (e.g., height, width, and/or length) based on the relative locations of the identified sensors; and storing information specifying the item's geometrical dimensions (e.g., height, width, and/or length) in the local memory of the OOS sensor. In some scenarios, the item's geometrical dimensions are not measured, but instead input by an individual via a user-software interaction and/or downloaded from a remote datastore 114.

Once calibrated, a plurality of items $118_1$-$118_5$ are stocked on the display equipment 122 so as to be respectively placed on the OOS sensors $104_1$-$104_3$. Each OOS sensor $104_1$-$104_3$ then measures the total weight of the items placed thereon, and stores information specifying the measured total weight. This measured total weight is used by the OOS sensor $104_1$-$104_3$ to detect when a new item is placed thereon or when an item has been removed therefrom. In response to this detection, the OOS sensor once again measures the total weight of the items thereon, and updates the respective stored information to reflect the newly measured total weight. In this way, the OOS sensor $104_1$-$104_3$ tracks changes in the item's inventory on the display equipment 122.

In some scenarios, the OOS sensor communicates information to a remote computing device 112 indicating that an item has been removed therefrom or a new item has been placed thereon. In the latter case, the communication includes information indicating the weight of the newly placed item and/or a maximum size of the newly placed item. The computing device 112 uses this information to monitor and track inventory, as well as take any measures to update inventory. For example, the computing device 112 notifies store personnel that a misplaced item is located on the OOS sensor $104_1$. The computing device 112 may also use the newly placed items weight and maximum size to identify at least one item with matching characteristics. The item level information 116 stored in datastore 114 can be used here to make this identification. The store personnel is also notified of the identified item(s), i.e., the possible item(s) that may have been placed on the OOS sensor $104_1$. The store personnel is then dispatched to the location to confirm that an item has been misplaced, and if so take the item back to its assigned location in the facility 102.

The computing device 112 can be local to the facility 102 as shown in FIG. 1 or remote from the facility 102. The computing device 112 will be described in detail below in relation to FIG. 6. However, at this time, it should be understood that the computing device 112 is configured to: write data to and read data from a datastore 114 and/or OOS sensors $104_1$-$104_3$; and/or perform language and currency conversion operations using item level information obtained from the datastore 114 and/or OOS sensors $104_1$-$104_3$. The data can include, but is not limited to, item level information 116 and/or inventory information 134.

Accordingly, the computing device 112 facilitates updates to: the inventory information 134 using information received from the OOS sensors $104_1$-$104_3$; and/or the item level information output from the OOS sensors $104_1$-$104_3$. Such information updating can be performed periodically, in response to instructions received from an associate (e.g., a retail store employee), and/or in response to a detected change in the information 116, 134.

The network 110 interconnects the computing device 112 with at least one access point 128. Network 110 can be a wired or wireless network facilitating communication between computing device 112 and the access point 128. The access point 128 facilitates the communication of information between the computing device 112 and OOS sensors $104_1$-$104_3$ via wireless communication links 124.

Although a single computing device 112 is shown in FIG. 1, the present solution is not limited in this regard. It is contemplated that more than one computing device can be implemented. Also, the present solution is not limited to the exemplary inventory system architecture described in relation to FIG. 1. For example in other scenarios, the present solution is used in a system such as that disclosed in U.S. Patent Publication No. 2012/0326849 to Relihan et al. (incorporated herein by reference).

In retail applications, an entire store floor can be seen as one entity learning about itself and the location of each item. A database of item locations and characteristics is built overtime interactively using the OOS sensors and/or manual inputs. The intelligent store floor reduces the time of discovery for shrinkage, aiding in loss prevention. In the event of shelf-swapping, the OOS sensors can alert store associates. If the item is removed from an OOS sensor and not paid for in a timely manner, the item can be tagged as a misplaced or possibly stolen item.

Since the location and quantity of all merchandise are known in real-time, customers or store associates can quickly retrieve any item sold either in-store or over the World Wide Web ("WWW"). This also provides a mechanism for real-time shopping statistics to monitor things like flash sales without waiting until the Point Of Sale ("POS"). Retail stores can obtain statistics about potential purchases that are then reconsidered and put back on the shelf, giving retailers an additional data point to aid them in increasing conversions.

The OOS sensors increase inventory accuracy and makes the inventory more real-time. This allows retail stores to advertise an accurate total number of items in its inventory. It also facilitates online shopping so the retail store readily knows a precise count of items in its inventory so the online orders can be filled or the item can be marked as out-of-stock almost immediately upon the last item being removed from the shelf.

Figure 2:
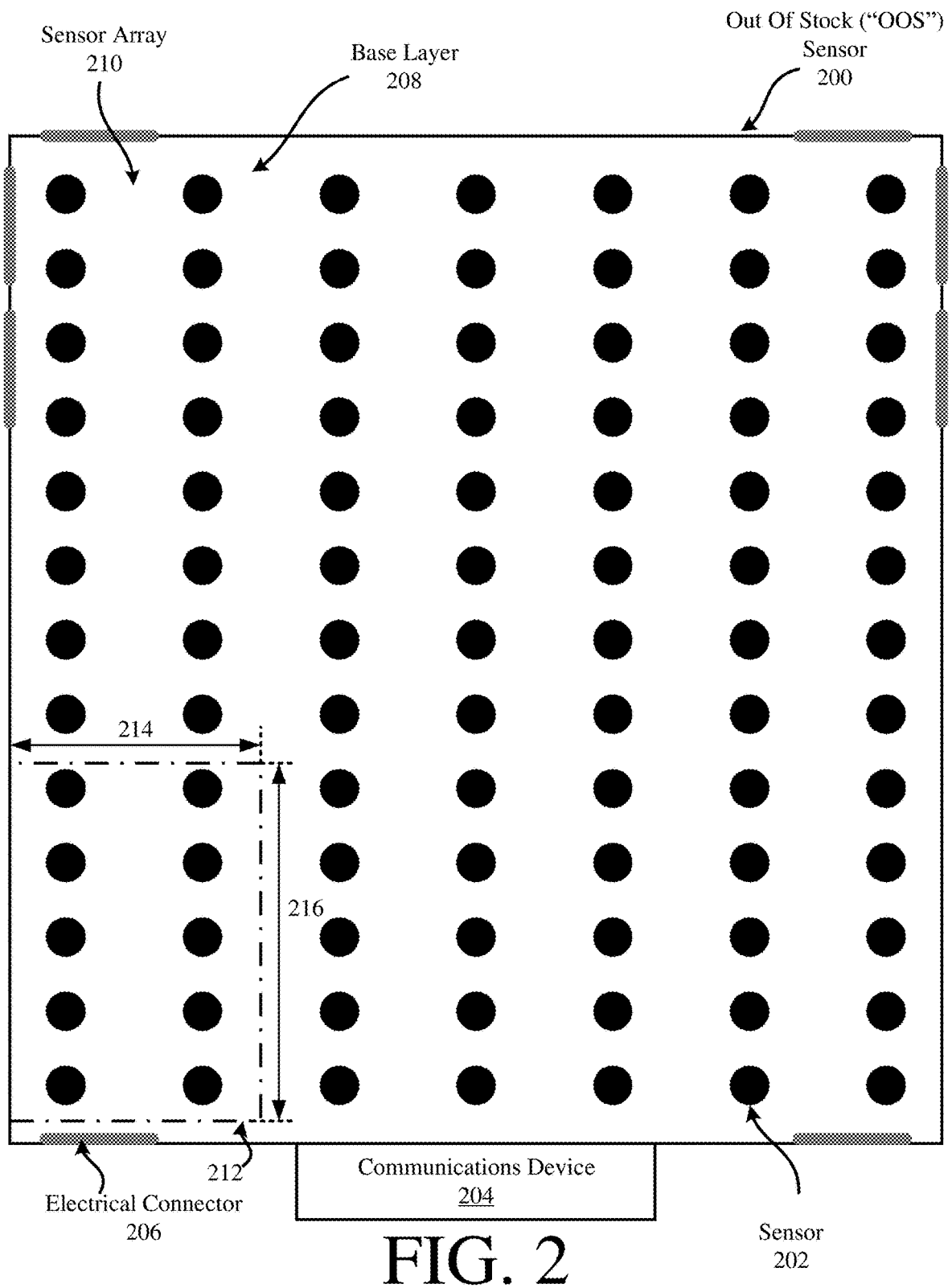
FIG. 2 is an illustration of an illustrative Out Of Stock ("OOS") sensor.

Referring now to FIG. 2, there is provided an illustration of an illustrative OOS sensor 200. OOS sensors $104_1$, . . . , $104_3$ of FIG. 1 are the same as or similar to OOS sensor 200 of FIG. 2. As such, the discussion of OOS sensor 200 is sufficient for understanding OOS sensors $104_1$, . . . , $104_3$ of FIG. 1.

As shown in FIG. 2, the OOS sensor 200 comprises a base layer 208 with a plurality of sensors 202 disposed therein, coupled thereto, integrated therewith, or embedded therein. The number of sensors can vary from OOS sensor to OOS sensor depending on the resolution required for given applications. For example, an OOS sensor that is to be used with smaller items has a higher sensor density, then an OOS sensor that is to be used with larger items. The present solution is not limited to the particulars of this example.

The base layer 208 is formed of a flexible material. The flexible material includes, but is not limited to, a plastic material, a rubber material (e.g., a silicone material), and/or a synthetic polymer based material (e.g., neoprene). The base layer 208 can have any shape selected in accordance with a particular application. For example, the base layer 208 has a generally rectangular shape with a flat or planar cross-sectional profile. The present solution is not limited in this regard. The base layer 208 can alternatively have a circular shape, an elliptical shape, a square shape, or any other shape. Also, the base layer 208 can be formed of a non-flexible or semi-flexible material.

A coupler (not shown) can be provided with the base layer 208 for coupling the OOS sensor 200 to a surface (e.g., a top shelf surface of display equipment 122 of FIG. 1). The coupler can include, but is not limited to, an adhesive disposed on a bottom surface of the base layer 208, a mechanical coupler (e.g., straps, bands, clamps, snaps, suction cups, etc.), or other coupling means.

A coupler may not be provided when a frictional engagement between the bottom surface of the base layer 208 and an adjacent surface of an adjacent object (e.g., a top surface or sidewall of display equipment) is sufficient to prevent shifting or movement of the base layer 208 relative to the adjacent object. The frictional engagement can be achieved through the use of a rubber material or a plastic material at least on a bottom surface of the OOS sensor. The OOS sensor's bottom surface can be smooth, rough or patterned with outwardly extending protrusions.

The OOS sensor 200 is modular so that it can be used collectively with other OOS sensors as a combined larger OOS sensor. In this regard, the OOS sensor 200 comprises at least one electrical connector 206 configured to mate with an electrical connector of another OOS sensor. A larger OOS sensor 400 is shown in FIG. 4 as comprising two modular OOS sensors electrically coupled to each other via electrical connectors 402. Although electrical connectors are shown in FIGS. 2 and 4 on all four sides of each OOS sensor, the present solution is not limited in this regard. One or more electrical connectors can be provided on a single side of an OOS sensor or multiple sides of the OOS sensor. The number and placement of electrical connector(s) is selected based on a given application.

Referring again to FIG. 2, the sensors 202 are arranged as an array of sensors 210. The sensor array 210 can have any arrangement or configuration, such as a grid pattern shown in FIG. 2 or as a set of concentric circles, squares, triangles, ellipses, etc. (not shown). The sensors 202 can include, but are not limited to, weight measuring sensors (e.g., piezoresistive sensors, and/or sensors based on graphene and carbon nanotubes), magnetoresistive sensors, Infrared ("IR") sensors, photoelectric sensors, and/or capacitive sensors. In some scenarios, the sensors 202 include only one type of sensor (e.g., piezoresistive sensors). In other scenarios, the sensors 202 include two or more types of sensors (e.g., piezoresistive sensors and capacitive sensors).

For example, if the OOS sensor 200 has an L-shape similar to that of OOS sensor $104_2$ of FIG. 1, then piezoresistive sensors can be provided on a bottom wall 140 of the OOS sensor and capacitive sensors are provided on the sidewall 142 of the OOS sensor. The piezoresistive sensors are provided to measure the weight and size of items placed on the OOS sensor, while the capacitive sensors are provided to measure the height of the item(s) placed on the OOS sensor. The present solution is not limited to the particulars of this example.

Figure 3:
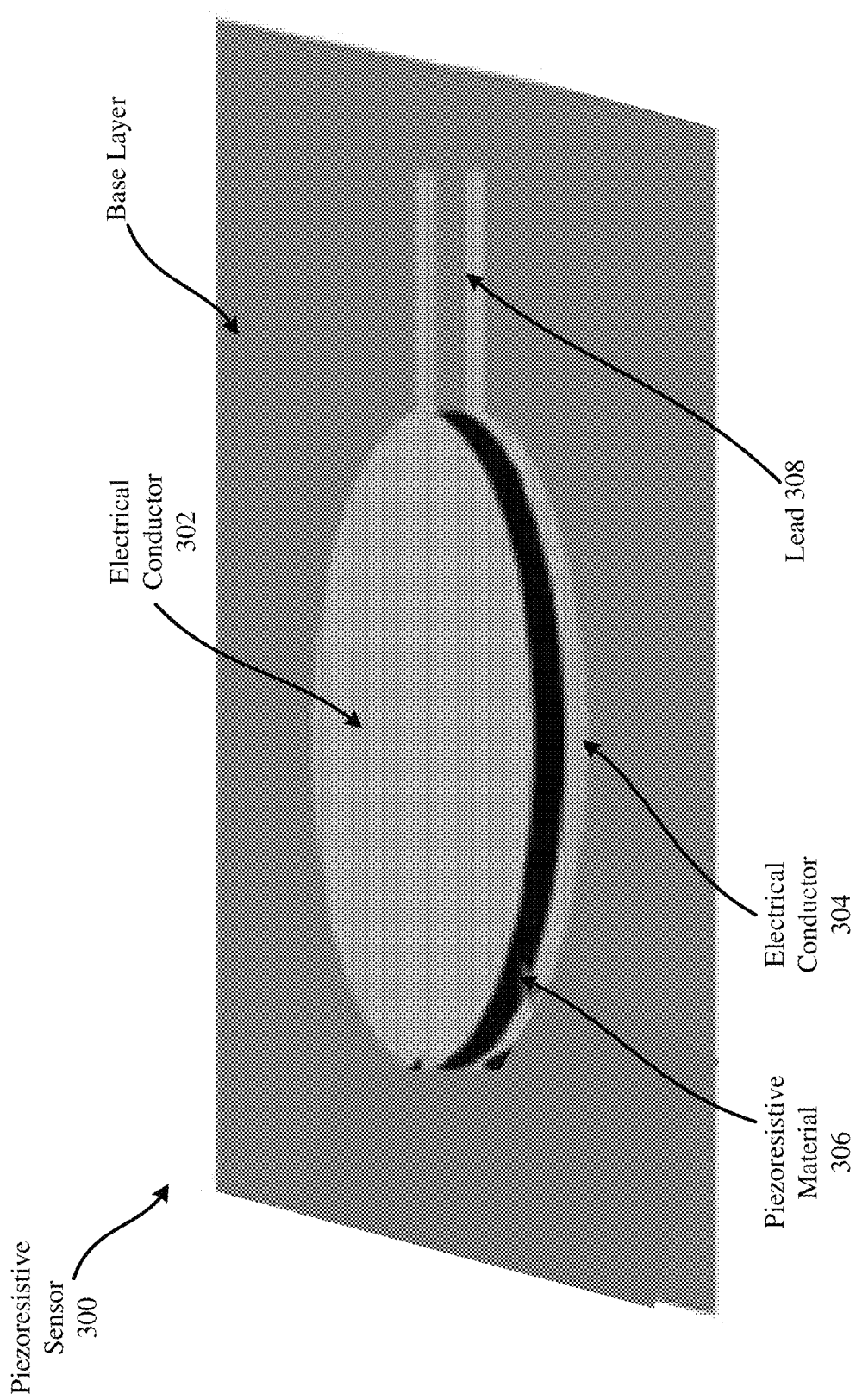
FIG. 3 is an illustration of an illustrative piezoresistive sensor of an OOS sensor.

An illustration of an illustrative piezoresistive sensor is provided in FIG. 3. As shown in FIG. 3, the piezoresistive sensor 300 comprises a piezoresistive material 306 sandwiched between two parallel electrical conductors 302, 304. Each electrical conductor 302, 304 is coupled to a respective lead 308. The leads 308 electrically connect the piezoresistive sensor 300 to other electrical components of the OOS sensor, such as other sensors of the sensor array and/or a communications device. The piezoresistive material 306 can include, but is not limited to, Velostat.

Referring again to FIG. 2, the OOS sensor additionally comprises a communications device 204. The communications device 204 is electrically connected to the sensors 202 such that it can receive sensor data therefrom. The sensor data is used by the communications device 204 to monitor any changes in inventory (i.e., the removal or addition of items therefrom or thereto) and/or the misplacement of items within a facility (e.g., facility 102 of FIG. 1).

Figure 5:
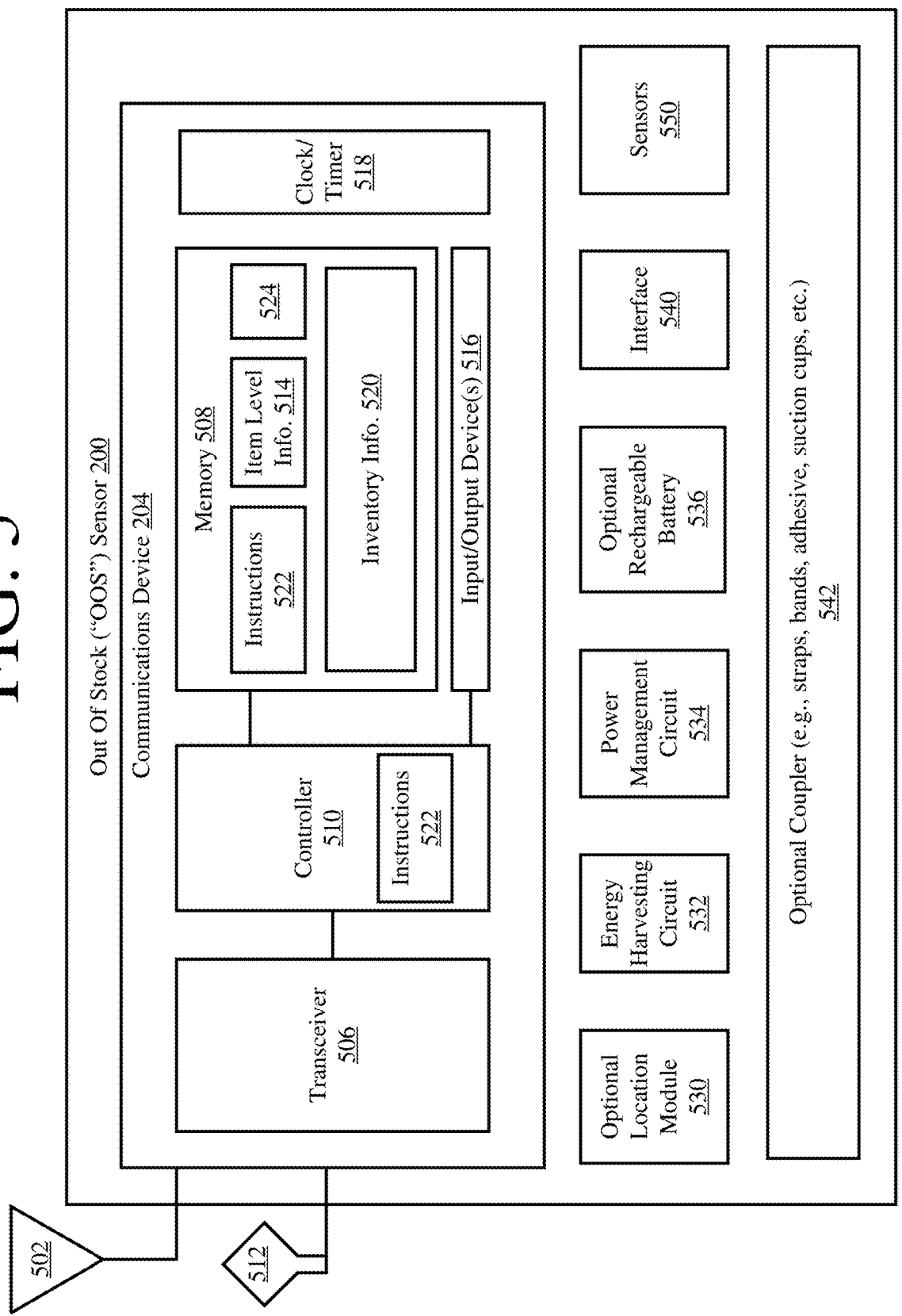
FIG. 5 is an illustration that is useful for further understanding the OOS sensor of FIG. 2.

An illustration of an illustrative architecture for the OOS sensor's 200 electrical and mechanical architecture is provided in FIG. 5. The OOS sensor 200 can include more or less components than that shown in FIG. 5. However, the components shown are sufficient to disclose an illustrative embodiment implementing the present solution. Some or all of the components of the OOS sensor 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 5 represents an illustrative OOS sensor 200 configured to facilitate improved inventory management. In this regard, the OOS sensor 200 is configured for allowing data to be exchanged with an external device (e.g., computing device 112 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is)are employed: Radio Frequency ("RF") communication technology; Bluetooth technology; WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 506-518 shown in FIG. 3 may be collectively referred to herein as the communications device 204, and include a memory 508 and a clock/timer 518. Memory 508 may be a volatile memory and/or a non-volatile memory. For example, the memory 508 can include, but is not limited to, Random Access Memory ("RAM"), Dynamic RAM ("DRAM"), Static RAM ("SRAM"), Read Only Memory ("ROM") and flash memory. The memory 508 may also comprise unsecure memory and/or secure memory.

In some scenarios, the communications device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 508. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed OOS sensor 200. The update of the firmware, in case of issues, can also be performed remotely.

As shown in FIG. 5, the communications device 204 comprises at least one antenna 502, 512 for allowing data to be exchanged with the external device via a wireless communication technology (e.g., an RFID technology, an NFC technology and/or a SRC technology). The antenna 502, 512 is configured to receive signals from the external device and/or transmit signals generated by the communications device 204. In some scenarios, the antenna 502, 512 comprises a near-field or far-field antenna. The antennas includes, but are not limited to, a chip antenna or a loop antenna.

The communications device 204 also comprises a transceiver 506. Transceivers are well known in the art, and therefore will not be described herein. However, it should be understood that the transceiver 506 generates and transmits signals (e.g., RF carrier signals) to external devices, as well as receives signals (e.g., RF signals) transmitted from external devices. In this way, the communications device 506 facilitates the registration, identification, location and/or tracking of an item (e.g., item $118_1, \ldots, 118_5$ of FIG. 1) within a facility (e.g., facility 102 of FIG. 1). The communications device 204 also facilitates the automatic and dynamic modification of item level information and/or inventory information that is being or is to be output from the OOS sensor 200 in response to certain trigger events. The trigger events can include, but are not limited to, the OOS sensor's arrival at a particular facility (e.g., facility 102 of FIG. 1) or location within the particular facility, the OOS sensor's arrival in a particular country or geographic region, a date occurrence, a time occurrence, a price change, an inventory change, and/or the reception of user instructions.

Item level information 514, inventory information 520 and/or other information 524 associated with the identification and/or location of the OOS sensor 200 can be stored in memory 508 of the communications device 204 and/or communicated to other external devices (e.g., computing device 112 of FIG. 1) via transceiver 506 and/or interface 540 (e.g., an Internet Protocol or cellular network interface). For example, the communications device 504 can communicate information specifying a timestamp, a unique identifier, item description (e.g., weight and size), item price, a currency symbol and/or location information to an external computing device. The external computing device (e.g., server) can then store the information in a database (e.g., database 114 of FIG. 1) and/or use the information during inventorying processes.

The communications device 204 also comprises a controller 510 and input/output devices 516. The controller 510 can also execute instructions 522 implementing methods for facilitating the management of item inventory. In this regard, the controller 510 includes a processor (or logic circuitry that responds to instructions) and the memory 508 includes a computer-readable storage medium on which is stored one or more sets of instructions 522 (e.g., software code) configured to implement one or more of the methodologies, procedures, or functions described herein. The instructions 522 can also reside, completely or at least partially, within the controller 510 during execution thereof by the OOS sensor 200. The memory 508 and the controller 510 also can constitute machine-readable media. The term "machine-readable media", as used here, refers to a single medium or multiple media (e.g., a centralized or distributed database, and/or associated caches and servers) that store the one or more sets of instructions 522. The term "machine-readable media", as used here, also refers to any medium that is capable of storing, encoding or carrying a set of instructions 522 for execution by the OOS sensor 200 and that cause the OOS sensor 200 to perform any one or more of the methodologies of the present disclosure.

The input/output devices can include, but are not limited to, a display (e.g., an E Ink display, an LCD display and/or an active matrix display), a speaker, a keypad, light emitting diodes, and/or push buttons. The display is used to present item level information and/or inventory information in a textual format and/or graphical format. Similarly, the speaker may be used to output item level information and/or inventory information in an auditory format. The speaker and/or light emitting diodes may be used to output alerts for drawing a person's attention to the OOS sensor 200 and/or for notifying the person of a particular item's inventory status.

The clock/timer 518 is configured to determine a date, a time, and/or an expiration of a pre-defined period of time. Technique for determining these listed items are well known in the art, and therefore will not be described herein. Any known or to be known technique for determining these listed items can be used herein without limitation.

The OOS sensor 200 also comprises an optional location module 530. The location module 530 is generally configured to determine the geographic location of the OOS sensor 200 at any given time. For example, in some scenarios, the location module 530 employs Global Positioning System ("GPS") technology and/or Internet based local time acquisition technology. The present solution is not limited to the particulars of this example. Any known or to be known technique for determining a geographic location can be used herein without limitation. Knowledge of the OOS sensor's location is desirable to verify the item's location within a facility. Also, it may be desirable to periodically check the OOS sensor's location to ensure that it has not been moved (e.g., inadvertently) during its intended use with given items.

The optional coupler 542 is provided to securely or removably couple the OOS sensor 200 to an item (e.g., item $118_1, \ldots$, or $118_5$ of FIG. 1). The coupler 542 includes, but is not limited to, a mechanical coupler (e.g., straps, bands, clamps, snaps, suction cups, etc.), an adhesive (e.g., glue or sticker), or other means. The coupler 542 is optional since the coupling can be achieved via frictional engagement between the OOS sensor and an external object.

The OOS sensor 200 can also include an optional rechargeable battery 536. Batteries are well known in the art, and therefore will not be described herein. Any known or to be known battery can be used herein without limitation. The battery is used to power electronic components 204, 530, 540 and/or 550 of the OOS sensor 200. The listed electronic components can additionally or alternatively be powered by an external power source (e.g., an AC mains) or an energy harvesting circuit 532. Electronic components 550 include sensors. The sensors can include, but are not limited to, sensors configured to measure the weight and/or size of an adjacent item as described herein. In this regard, the sensors 550 comprise at least sensors 202 described above in relation to FIG. 2.

The energy harvesting circuit 532 and a power management circuit 534 are provided for ensuring continuous operation of the OOS sensor 200 without the need to change a battery. In some scenarios, the energy harvesting circuit 532 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy.

The energy harvesting circuit 532 can operate in two (2) ways. First, the energy harvesting circuit 532 can harvest energy from an available source while in use (i.e., when disposed on a store floor). Second, the energy harvesting circuit 532 can harvest energy while offline (i.e., when the OOS sensor 200 is detached removed from a store floor) via a charging station/bin. This ensures that the OOS sensor 200 is fully charged when the OOS sensor is ready to be deployed or go online.

Figure 6:
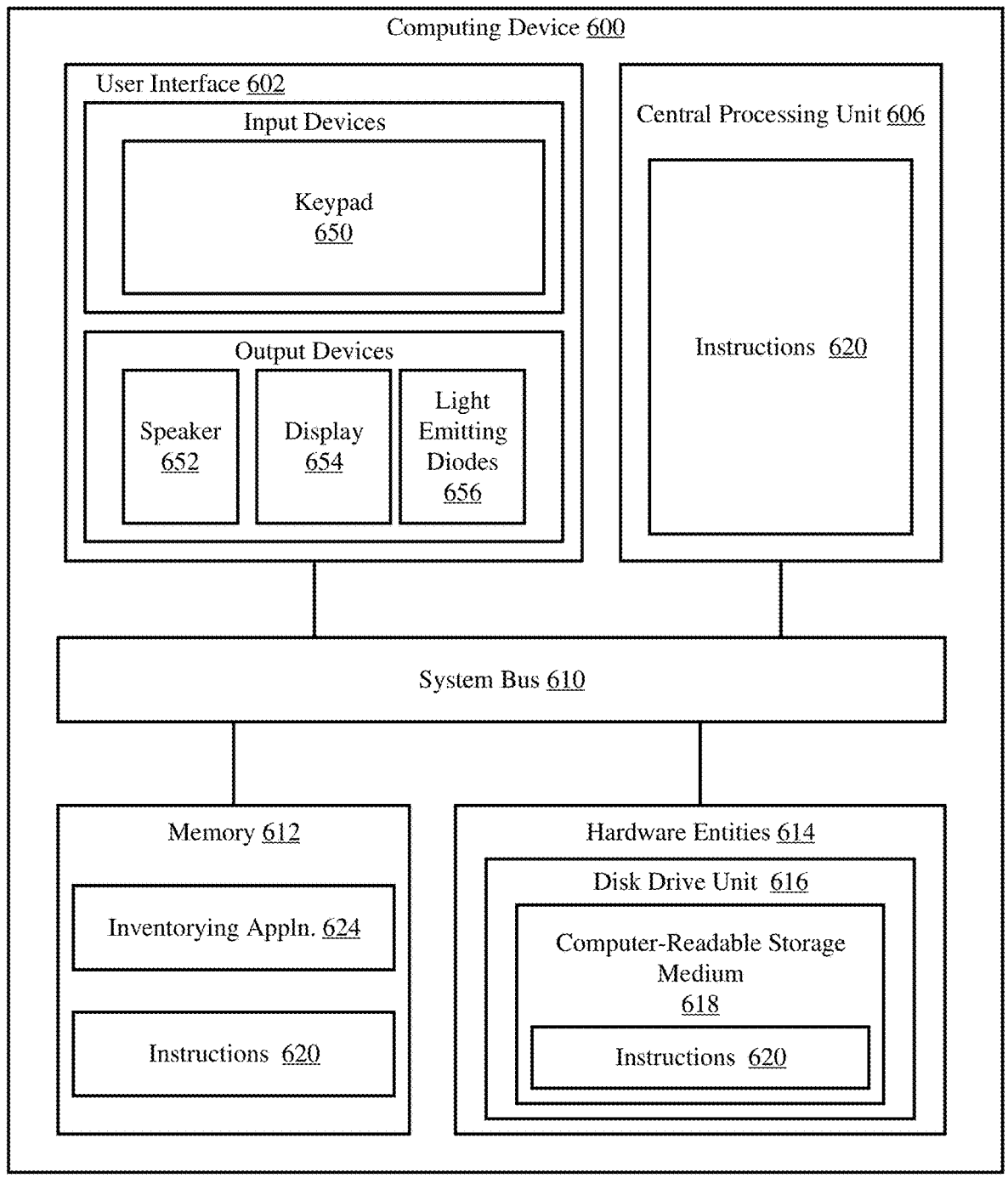
FIG. 6 is an illustration of an illustrative computing device.

Referring now to FIG. 6, there is provided a detailed block diagram of an exemplary architecture for a computing device 600. Computing device 112 of FIG. 1 is the same as or substantially similar to computing device 600. As such, the following discussion of computing device 600 is sufficient for understanding computing device 112.

Computing device 600 may include more or less components than those shown in FIG. 6. However, the components shown are sufficient to disclose an illustrative embodiment implementing the present solution. The hardware architecture of FIG. 6 represents one embodiment of a representative computing device configured to facilitate improved inventory management. As such, the computing device 600 of FIG. 6 implements at least a portion of a method for automatically and dynamically modifying item level information and/or inventory information within an enterprise system in accordance with the present solution.

Some or all the components of the computing device 600 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 6, the computing device 600 comprises a user interface 602, a Central Processing Unit ("CPU") 606, a system bus 610, a memory 612 connected to and accessible by other portions of computing device 600 through system bus 610, and hardware entities 614 connected to system bus 610. The user interface can include input devices (e.g., a keypad 650) and output devices (e.g., speaker 652, a display 654, and/or light emitting diodes 656), which facilitate user-software interactions for controlling operations of the computing device 600.

At least some of the hardware entities 614 perform actions involving access to and use of memory 612, which can be a RAM, a disk driver and/or a Compact Disc Read Only Memory ("CD-ROM"). Hardware entities 614 can include a disk drive unit 616 comprising a computer-readable storage medium 618 on which is stored one or more sets of instructions 620 (e.g., software code) configured to implement one or more of the methodologies, procedures, or functions described herein. The instructions 620 can also reside, completely or at least partially, within the memory 612 and/or within the CPU 606 during execution thereof by the computing device 600. The memory 612 and the CPU 606 also can constitute machine-readable media. The term "machine-readable media", as used here, refers to a single medium or multiple media (e.g., a centralized or distributed database, and/or associated caches and servers) that store the one or more sets of instructions 620. The term "machine-readable media", as used here, also refers to any medium that is capable of storing, encoding or carrying a set of instructions 600 for execution by the computing device 600 and that cause the computing device 600 to perform any one or more of the methodologies of the present disclosure.

In some scenarios, the hardware entities 614 include an electronic circuit (e.g., a processor) programmed for facilitating the provision of item level information and/or inventory information in a language and/or currency used in a given geographic location whereat or wherein the OOS sensor resides. In this regard, it should be understood that the electronic circuit can access and run an inventorying application 624 installed on the computing device 600. The software application 624 is generally operative to: obtain item level information, inventory information and/or other information from OOS sensors; program item level information and/or inventory information onto OOS sensors; convert the language, pricing and/or currency symbol of item level information; and/or facilitate registration of OOS sensors with inventory systems. Other functions of the software application 624 will become apparent as the discussion progresses.

Figure 7A:
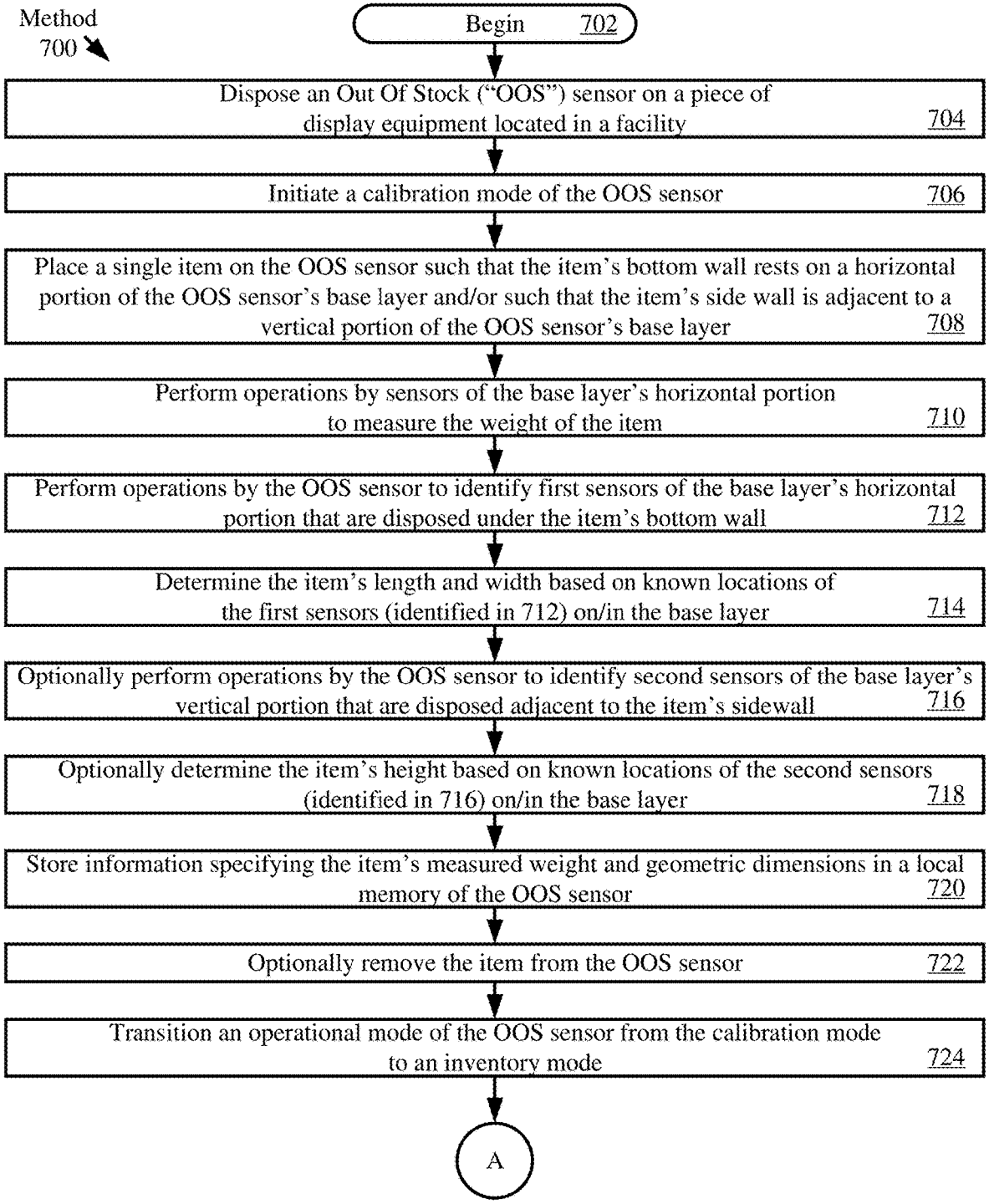

Referring now to FIG. 7, there is provided a flow diagram of an exemplary method 700 for performing inventory management. Method 700 begins with 702 and continues with 704 where an OOS sensor (e.g., OOS sensor $104_1$, $104_2$, $104_3$ of FIG. 1 or 200 of FIG. 2) is disposed on a piece of display equipment (e.g., display equipment 122 of FIG. 1). The piece of display equipment may reside on a store floor or in a back room. As noted above, the OOS sensor can be integrated with or embedded in the display equipment. In this case, method 700 can be absent of 704.

In next 706, a calibration mode of the OOS sensor is initiated. The calibration mode is performed to set values of certain parameters to new values in a local memory (e.g., memory 508 of FIG. 5) of the OOS sensor. Accordingly, method 700 continues with operations 708-722 to calibrate the OOS sensor for use with an assigned type of item (e.g., shoes stored in a shoe box, or a perishable item stored in a box, can or jar). 708 involves placing a single item (e.g., a box, can or jar) on the OOS sensor such that the item's bottom wall or surface (e.g., bottom wall or surface 144 of FIG. 1) rests on a horizontal portion (e.g., portion 140 of FIG. 1) of the OOS sensor's base layer (e.g., base layer 208 of FIG. 2) and/or such that the item's side wall or surface (e.g., bottom wall or surface 146 of FIG. 1) is adjacent to a vertical portion (e.g., portion 142 of FIG. 1) of the OOS sensor's base layer.

Subsequently in 710, operations are performed by sensors (e.g., sensors 202 of FIG. 2 or 550 of FIG. 5) of the base layer's horizontal portion to measure the weight of the item (e.g., 2-2.5 lbs for running shoes). These sensors can include, but are not limited to, piezoresistive sensors (e.g., piezoresistive sensor 300 of FIG. 3).

Next, operations are performed to obtain information indicating the geometrical dimensions of the item. In some cases, this information is input into the system via user-software interactions (e.g., via computing device 112 of FIG. 1), or obtained from a datastore (e.g., datastore 114 of FIG. 1). In other cases, the item's geometrical dimensions are determined by the OOS sensor. Therefore, method 700 is presented as comprises optional blocks 712-718.

In 712, the OOS sensor performs operations to identify first sensors of the base layer's horizontal portion (e.g., sensors 212 of FIG. 2) that are disposed under the items bottom wall or surface. The item's length (e.g., length 216 of FIG. 2) and width (e.g., width 214 of FIG. 2) are determined in 714 based on known locations of the first sensors on/in the base layer. The operations of 712-714 are made by a processor circuit (e.g., controller 510 of FIG. 5) of the OOS sensor.

The processor circuit of the OOS sensor can also optionally perform operations in 716-718 to: identify second sensors of the base layer's vertical portion that are disposed adjacent to the item's sidewall or surface; and determine the item's height based on the known locations of the second sensors on or in the base layer. These sensors can include, but are not limited to, capacitive sensors or light sensors.

Information is stored in 720 specifying the item's measured weight and geometric dimensions in a local memory (e.g., memory 508 of FIG. 5) of the OOS sensor. The item can then be optionally removed from the OOS sensor, as shown by 722.

Once calibration of the OOS sensor is completed, an operational mode of the OOS sensor is transitioned in 724 from the calibration mode to the inventory mode. The operational mode change can be achieved via a user-software interaction with the input devices (e.g., input devices 516 of FIG. 5) of the OOS sensor. In the cases where the calibration process is performed in a back room, 724 can also involve placing the OOS sensor on a piece of display equipment that resides on the store floor. Subsequently, method 700 continues with 726 of FIG. 7B.

As shown in FIG. 7B, 726 involves placing a plurality of items on the OOS sensor. The plurality of items are of the same type (e.g., shoes in a shoe box) as the item used during the calibration process. In next 728, the sensors of the base layer's horizontal portion perform operations to measure the collective weight of the items (e.g., 10-12.5 pounds for 5 pairs of running shoes). Information is then stored in a local memory of the OOS sensor as shown by 730. This information specifies the measured collective weight of the items.

The processor circuit of the OOS sensor may also optionally determine how many items currently reside thereon, as shown by 732. This determination can be made by dividing the collective weight measured in 728 for the plurality of items by the weight measured in 710 for a single item (e.g., 10÷2=5 pairs of running shoes). Information is then optionally stored in a local memory of the OOS sensor specifying the number of items currently disposed on the OOS sensor.

Next, the OOS sensor waits a pre-defined period of time. A clock/time (e.g., clock/timer 518 of FIG. 5) internal to the OOS sensor can be used to keep track of passing time such that a processor (e.g., controller 510 of FIG. 5) of the OOS sensor can detect when the pre-defined period of time expires. When the pre-defined period of time expires [736: YES], the OOS sensor repeats the operations of 728-730. In this regard, the OOS sensor once again performs operations to measure the collective weight of the items, and store information in its local memory specifying the measured collective weight. In 740, the collective weights measured in 728 and 738 are compared to each other to determine if there is a difference therebetween. This comparison is performed by the processor of the OOS sensor (e.g., controller 510 of FIG. 5). A greater collective weight measured in 738 indicates that an item has been added to the OOS sensor. In contrast, a smaller collective weight measured in 738 indicates that an item has been removed from the OOS sensor. If the collective weights match each other (e.g., exactly or by a certain degree) [742:NO], then method 700 returns to 738. If the collective weights do not match each other [742:YES], then method 700 continues with 744 of FIG. 7C.

In 744, a decision is made as to whether the item has been removed from the OOS sensor. This decision is made by the processor of the OOS sensor (e.g., controller 510 of FIG. 5). If not [744:NO], then method 700 continues with 770-788 of FIG. 7D, which will be discussed below. If so [744:YES], then method 700 continues with 746 which involves determining the number of items which currently reside on the OOS sensor. In some scenarios, this determination is made by dividing the collective weight measured in 738 by the weight measured in 710. Additionally or alternatively, this determination is made by or verified by: measuring a gap (blank spaces) between items disposed on the OOS sensor; and computing a total area of the OOS sensor's base layer on which the items are disposed using a known surface area of the base layer and the measured gap values.

If the number is greater than a threshold value (e.g., 0, 1 or 2) [748:NO], then 750 is performed where method 700 returns to 738. In contrast, if the number is less than or equal to the threshold value [748:YES], then a message is generated by the OOS sensor's processor circuit in 752. The message includes information indicating that the current number of items currently disposed on the OOS sensor is less than or equal to the threshold value. The message is communicated from the OOS sensor to a remote computing device (e.g., computing device 112 of FIG. 1), as shown by 754. This message is also referred to herein as a low inventory notification.

At the remote computing device, operations are performed to alert an individual of the low inventory on the OOS sensor, as shown by 756. The remote computing device also determines the remaining inventory in a back room and/or other facility location, as shown by 758. The remote computing device communicates information to the OOS sensor in 760 that indicates the remaining inventory in the back room and/or other facility. The information is then output from the OOS sensor (e.g., visually on a display screen and/or auditorily via a speaker).

In some cases, the OOS sensor receives a user-software interaction for having an item brought from the back room to the store floor, as shown by optional 764. The user-software interaction can be achieved via a push button of the OOS sensor and/or a mobile device (e.g., a smart phone). In response to the user-software interaction, an item request is sent to the remote computing device, as shown by 766. The item request can be sent from the OOS sensor and/or the mobile device (e.g., mobile device 126 of FIG. 1). Subsequently, 768 is performed where method 700 ends or other processing is performed.

Figure 7D:
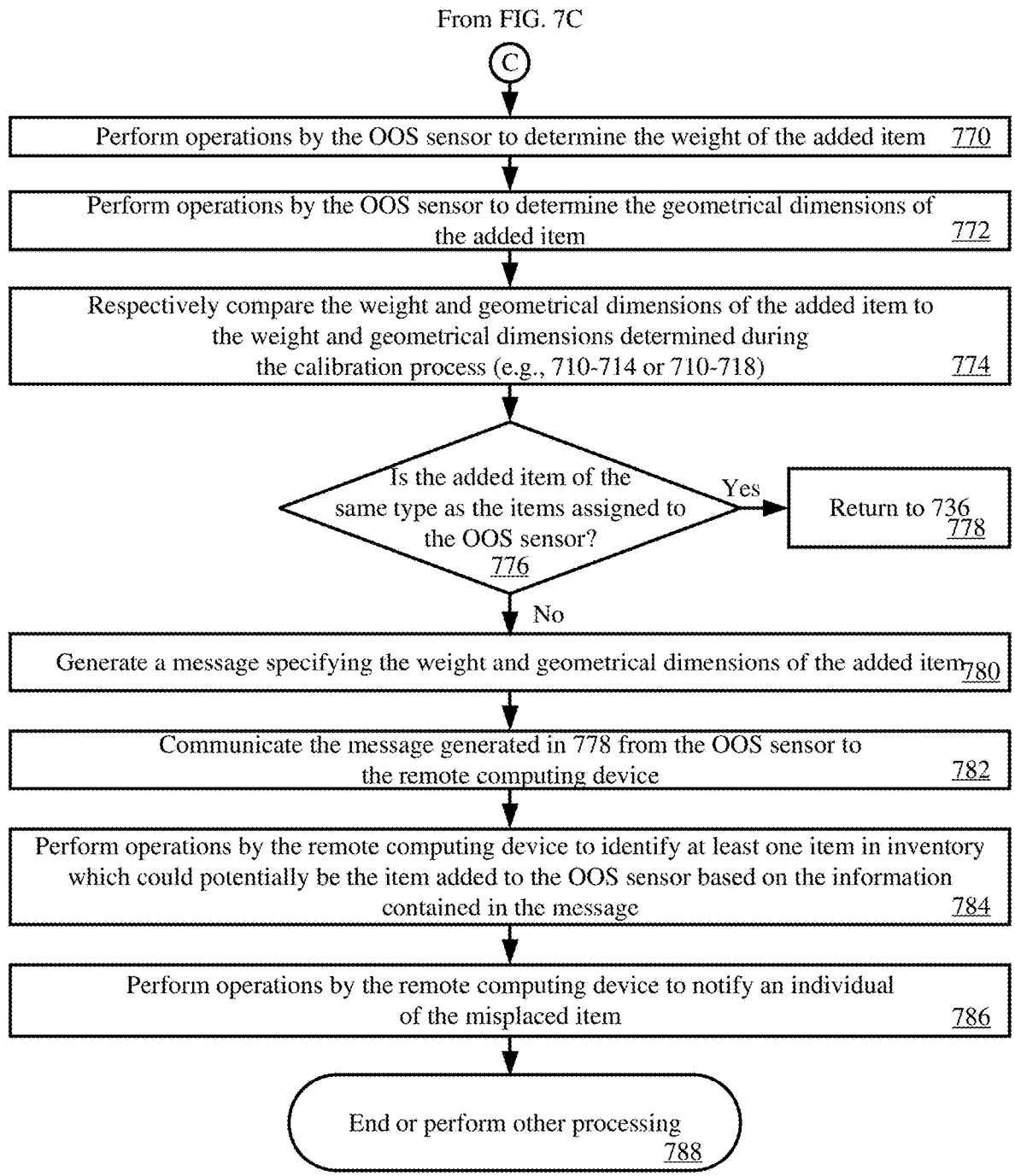

Referring now to FIG. 7D, operations of 770-788 are performed when an item has been added to the OOS sensor. 770-772 involve determining the weight and geometrical dimensions (e.g., length, width and/or height) of the added item. The geometrical dimensions can be determined using knowledge of which sensors are adjacent to or below the item and/or sensed/measured gap(s) between the item and at least one other item disposed on the OOS sensor. The geometrical dimensions can include, but are not limited to, a length, a width, a height, a radius, a diameter, a maximum possible length, a maximum possible width, and/or a maximum possible height. For example, a hair brush is disposed directly on the OOS sensor's base layer. As such, the length and width of the hair brush can be determined with a relatively high degree of accuracy. This is not the case when the hair brush is alternatively disposed on a shoe box. In this case, the geometrical dimensions of the hair brush cannot be determined by the OOS sensor since the shoe box (rather than the hair brush) is in direct contact with the base layer. Still, the maximum possible length and width are determined as comprising those of the shoe box. The present solution is not limited to the particulars of these examples.

Next in 774, the weight and geometrical dimensions of the added item are respectively compared to the weight and geometrical dimensions determined during the calibration process (e.g., the operations performed in 710-714 or 710-718). This comparison is performed to determine if the added item is of the same type as the items assigned to the OOS sensor (e.g., shoes in a shoe box). If the weight and/or geometrical dimensions of the added item respectively match (e.g., by a certain degree) the weight and/or geometrical dimensions of the item used during the calibration process, then a determination is made that the added item is of the same type as the items assigned to the OOS sensor. However, when such a match does not exist, a determination is made that the added item is of a different type than that of the items assigned to the OOS sensor. The operations of 774 are performed by the processor circuit of the OOS sensor.

If the added item is of the same type as the items assigned to the OOS sensor (e.g., shoes in shoe boxes) [776:YES], then 778 is performed where method 700 returns to 736. If the added item is not of the same type as the items assigned to the OOS sensor [776:NO], then 780 is performed where a message is generated. The message specifies the weight and geometrical dimensions of the added item. The message is communicated from the OOS sensor to the remote computing device in 782.

The remote computing device performs operations in 784 to identify at least one item in inventory which could potentially be the item added to the OOS sensor based on the information contained in the message. For example, the remote computing device searches item level information (e.g., item level information 116 of FIG. 1 and/or inventory information 134 of FIG. 1) to identify any item with a weight and/or size equal to or less than that specified in the message. The identified items are then considered items in inventory which could potentially be the item added to the OOS sensor.

In next 786, the remote computing device performs operations to notify an individual of the misplaced item. The notification can be achieved by sending a message (e.g., an email, a text message, or a push notification) to the individual's mobile device (e.g., smart phone). The notification can include a list of the identified items which could potentially be the item added to the OOS sensor. In this way, the individual can be dispatched to location of the misplaced item for purposes of confirming that the item is misplaced and returning the item to its proper location in the facility. Subsequently, 788 is performed where method 700 ends or other processing is performed.

All of the apparatus, methods, and algorithms disclosed and claimed herein can be made and executed without undue experimentation in light of the present disclosure. While the present solution has been described in terms of preferred embodiments, it will be apparent to those having ordinary skill in the art that variations may be applied to the apparatus, methods and sequence of steps of the method without departing from the concept, spirit and scope of the present solution. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the present solution as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. An inventory system, comprising:
   an Out Of Stock ("OOS") sensor comprising:
   a base layer defining a bottom wall of the OOS sensor, having a planar cross-sectional profile, and extending horizontally relative to ground;
   an array of weight measuring sensors integrated with the base layer and configured to measure, at a first time, a first collective weight of a plurality of items disposed on the base layer, and measure, at a second later time, a second collective weight of a plurality of items disposed thereon;
   a sidewall coupled to the bottom wall, having a planar cross-sectional profile, and extending vertically relative to ground;
   an array of height measuring sensors integrated with the sidewall and configured to measure a height of the plurality of items disposed on the base layer;
   a location module to facilitate verification that the OOS sensor has not been moved during use with a given item;
   a processor circuit configured to:
   use the first collective weights, the second collective weights and the height to determine if an item has been added to or removed from the OOS sensor; and
   a communications device configured to wirelessly communicate a notification that the item has been added to or removed from the OOS sensor such that stored inventory information is updated accordingly, wherein the OOS sensor is configured to be disposed on a piece of display equipment.

2. The inventory system according to claim 1, wherein the processor circuit determines that the item has been added to the OOS sensor when the second collective weight is greater than the first collective weight.

3. The inventory system according to claim 1, wherein the processor circuit determines that the item has been removed from the OOS sensor when the first collective weight is greater than the second collective weight.

4. The inventory system according to claim 1, wherein the processor circuit is further configured to:
   determine a number of items currently residing on the OOS sensor by dividing the second collective weight by a reference weight previously measured for a single item;
   compare the number of items to a threshold value; and
   cause a low inventory notification to be communicated from the OOS sensor when the number of items is less than the threshold value.

5. The inventory system according to claim 4, wherein the processor circuit is further configured to:
   obtain current inventory information indicating a remaining inventory for the item in a back room or other facility location; and
   cause the current inventory information to be output from the OOS sensor, wherein the output includes one or a combination of visual or auditory output.

6. The inventory system according to claim 1, wherein the processor circuit is further configured to:
   determine if the item added thereto is of a same type as an item assigned to the OOS sensor; and
   cause added item information indicating at least a measured weight of the item added thereto to be communicated from the OOS sensor, when a determination is made that the item added thereto is not of the same type as the item assigned to the OOS sensor.

7. The inventory system according to claim 6, wherein the measured weight contained in the added item information is used to identify at least one item in inventory which could potentially be the item added to the OOS sensor.

8. The inventory system according to claim 6, wherein an individual is notified of a misplaced item disposed on the OOS sensor, when the item added thereto is not of the same type as the item assigned to the OOS sensor.

9. The inventory system according to claim 1, wherein the OOS sensor is modular so that the OOS sensor is collectively used with other modular OOS sensors as a combined OOS sensor.

10. The inventory system according to claim 9, wherein the OOS sensor comprises at least one electrical connector configured to mate with at least one electrical connector of the other modular OOS sensors.

11. The inventory system according to claim 1, wherein sensors of the array of weight measuring sensors are arranged as at least one set of concentric shapes.

12. The inventory system according to claim 1, wherein the height measuring sensors comprise capacitive sensors.

13. The inventory system according to claim 1, wherein the weight measuring sensors and the height measuring sensors are of a same sensor type.

14. The inventory system according to claim 1, wherein the weight measuring sensors and the height measuring sensors are of a different sensor type.

15. The inventory system according to claim 1, further comprising a communication device that implements LiFi technology or Software Defined Radio ("SDR") technology.

16. The inventory system according to claim 1, wherein the OOS sensor further comprises:
a request interface that facilitates input of a request for an item to be brought to a current location of the OOS sensor;
a communications device configured to wirelessly communicate with an inventory device remote from the OOS sensor; and
the processor circuit further configured to:
receive, via the request interface, a request for having an item retrieved from a remote location and brought to the current location of the OOS sensor; and
cause the received request to be communicated from the OOS sensor to the inventory device in response to a user-software interaction.

17. The inventory system according to claim 1, wherein the OOS sensor further comprises a communication device configured to:
facilitate automatic and dynamic modification of item level information or inventory information that is being or to be output from the OOS sensor, based at least in part on the location of the OOS sensor.

18. An inventory system, comprising:
an Out Of Stock ("OOS") sensor comprising:
a base layer defining a bottom wall of the OOS sensor, having a planar cross-sectional profile, and extending horizontally relative to ground;
an array of weight measuring sensors integrated with the base layer and configured to measure, at a first time, a first collective weight of a plurality of items disposed on the base layer, and measure, at a second later time, a second collective weight of a plurality of items disposed thereon;
a sidewall coupled to the bottom wall, having a planar cross-sectional profile, and extending vertically relative to ground;
an array of height measuring sensors integrated with the sidewall and configured to measure a height of the plurality of items disposed on the base layer; and
a processor circuit configured to:
use the first collective weights, the second collective weights and the height to determine if an item has been added to or removed from the OOS sensor;
a communications device configured to wirelessly communicate a notification that an item has been added to or removed from the OOS sensor such that stored inventory information is updated accordingly;
determine if the item added thereto is of a same type as an item assigned to the OOS sensor, wherein the determination that the item is of the same type is based at least in part on geometrical dimensions of the added item; and
cause added item information indicating at least a measured weight of the item added thereto to be communicated from the OOS sensor, when a determination is made that the item added thereto is not of the same type as the item assigned to the OOS sensor,
wherein the OOS sensor is configured to be disposed on a piece of display equipment.

19. The inventory system according to claim 1, wherein the sidewall is the only sidewall.

20. The inventory system according to claim 1, wherein the sidewall is the only sidewall.

* * * * *